June 6, 1950   J. W. GEISLER   2,510,098
TANK VENT
Filed Jan. 20, 1947
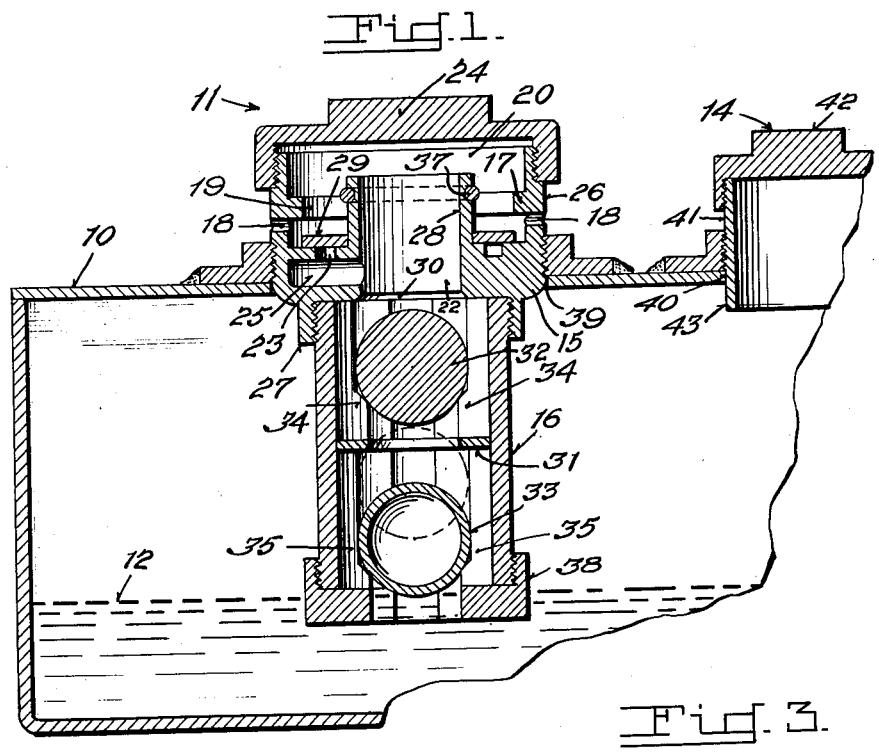
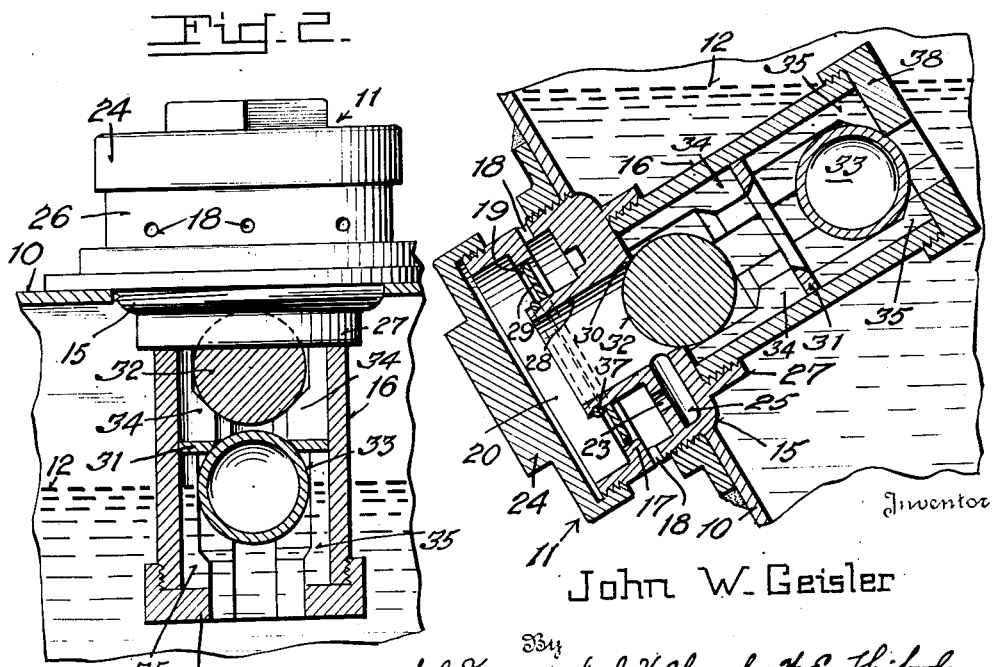
Inventor
John W. Geisler Patented June 6, 1950

2,510,098

UNITED STATES PATENT OFFICE 2,510,098

TANK VENT

John W. Geisler, Pittsburgh, Pa.

Application January 20, 1947, Serial No. 722,991

11 Claims. (Cl. 137—69)

(Granted under the act of March 3, 1883, as amended April 30, 1928; 370 O. G. 757)

The invention described herein may be manufactured and used by or for the Government for governmental purposes without the payment to me of any royalty thereon.

The present invention relates to improvements in vents of the type permitting air, gases and/or vapors to enter or leave tanks or vessels used to hold or store liquids.

Vents or venting devices are customary in tanks or vessels, for example in liquid fuel tanks, where it is necessary that provision be made to allow air to enter the tanks as liquid is withdrawn therefrom, and these vents may also serve to allow air, gases and/or vapors to leave the tanks during the filling of the latter with liquid; the pressure on the surface of liquid in a tank thus remains constant at all times, even though the liquid contents of the tank varies through withdrawal or filling.

Vents or venting devices for tanks as above discussed and in accordance with prior art may consist of a simple air opening in the top portion of the tank, for example an aperture in the cap closure for the filler opening. Such an opening or aperture, while permitting the necessary flow of air, gases and/or vapors into and from the tank, is unsatisfactory in many cases such as where the tank may be subjected to tilting thus allowing the level of the liquid in the tank to rise above the vent opening or aperture and resulting in leakage of the liquid therethrough. Such leakage through the above vent opening may be particularly serious and dangerous in the case of inflammable liquids, for example liquid fuel in the tanks of a tank truck or in the fuel tank of an automobile where leakage may occur through normal tilting of the tank or as a result of the overfilling thereof, or it may occur where the vehicle is wrecked and is lying at an angle or on its side or on its top. It is thus highly desirable to prevent such possible leakage through the vent or venting device.

Accordingly, it is an object of the present invention to provide, in a tank for holding or storing liquids, an improved vent of simple construction which will permit air, gases and/or vapors to enter or leave the tank and which will automatically close to prevent leakage of liquid from the tank through the vent when the tank is tilted from its normal position or when it is overfilled.

It is a further object of the present invention to provide, in combination with a tank and a liquid filler opening therein having an air tight closure, an improved vent device which will permit air, gases and/or vapors to enter or leave the tank but which will automatically close to prevent leakage therethrough when the tank is tilted or overfilled with liquid.

It is a further object of this invention to provide an improved vent device for a tank of the type described which is simple in operation and construction and which operates automatically to prevent leakage of liquid in the tank through the vent opening by the seating of a ball floatable on the liquid when the tank is overfilled and by seating of a heavy ball due to the action of gravity when the tank is tilted to any other than its normal position.

It is a further object of this invention to provide an improved vent device for a tank which by simple rolling action of elements thereof automatically operates to prevent leakage of liquid in the tank through the vent opening when the tank is overfilled or is tilted from normal position, the vent device further including simple and automatic self-cleaning means for preventing dirt, water and impurities in incoming air from entering the tank.

The above and other objects and advantages of my improved vent device will be apparent from an embodiment thereof as illustrated in the accompanying drawing in which:

Figure 1 is a side elevation view in section of my improved vent device showing the position of parts therein in a tank in normal position and with the liquid level shown.

Figure 2 is an end elevation view, partly in section, of my improved vent device showing the position of parts therein in a tank in normal position with the liquid level shown.

Figure 3 is a view similar to Figure 1 but showing the position of parts in my improved vent device with the tank inclined from normal position and with the liquid level shown.

For the purpose of illustration, numeral 10 designates a fuel tank having a quantity of liquid fuel 12 therein. Disposed in the top of tank 10 is my improved vent device generally designated by numeral 11. Also disposed in the top portion of tank 10 is an air tight filling device which may be of the simple tube and cap construction as illustrated by numeral 14 in which a tube 43 extends through a filler opening 40 in an air tight connection in the top of tank 10, and an air tight cap 42 closes the outer end of tube 43 in a threaded air tight connection. Thus, air tight filling device 14 may consist of the simple tube and cap construction commonly used as a filling device in the fuel tanks of motor vehicles except that, contrary to common construction, there is no vent hole in the cap.

Vent device 11 has an upper shell member 26 extending outside tank 10, and secured thereto a lower cylindrical housing member 16 depending inside tank 10. Generally cylindrical upper shell member 26 is threadedly secured air tight at a lower exterior portion thereof in an opening 39 in the top of tank 10. A threadedly secured cap 24 provides an air tight closure on the upper exterior end of upper member 26. Extending radially inward in a common horizontal plane through the outer cylindrical shell of upper shell member 26 below cap member 24 and outside tank 10, are a number of vent openings 18 providing communication between the atmosphere and the interior of member 26. Radially inward of the outer cylindrical shell of upper shell member 26 and with a longitudinal axis common thereto is an inner cylindrical portion 28 extending vertically from an inwardly extending web 15 at the lower portion of member 26 to a point below the top of the outer cylindrical shell, inner cylindrical portion 28 providing in the interior thereof a passage 22 for air, gases or vapors from or into tank 10. On the interior of the outer cylindrical shell of member 26, above vent openings 18, is an inwardly extending annular rib portion 17 providing a relatively restricted passage 19 between the outer cylindrical shell and inner cylindrical portion 28. In normal position as shown in Figure 1, the flow of air into tank 10 through vent device 11 is by way of vent openings 18, restricted passage 19, passage 20 below the cap, and thence through passage 22. A horizontal recess 25 extends radially outward inside web 15 from a lower portion of passage 22. Recess 25 has an opening in the upper side thereof in communication with a relatively deep annnular groove passage 23 in the upper horizontal surface of web 15. Slidably mounted on the exterior surface of inner cylindrical portion 28 is flat disc ring 29 normally closing passage 23 as shown in Figure 1, except upon rapid flow of air, gases or vapors from tank 10, or upon tilting of tank 10 as shown in Figure 3 when disc ring 29 is slidable on cylindrical portion 28 to the stop formed adjacent the normally upward end thereof, the stop comprising split spring ring 37 in a groove in the exterior surface of cylindrical portion 28 adjacent the normally upward end thereof. As further shown in Figure 3, with flat disc ring 29 in the position shown, restricted passage 19 is substantially closed, and the auxiliary passage comprising vent openings 18, passage 23, and recess 25 is opened. In the normal position shown in Figure 1, when liquid is withdrawn from tank 10, as above stated the flow of air into tank 10 through vent device 11 is by way of vent openings 18, restricted passage 19, passage 20, and thence passage 22, with flat disc ring 29 closing passage 23. Under these conditions, the position of flat disc ring 29 prevents dirt and water from entering cylindrical portion 28 since passage 23 is closed and dirt, water and such undesirable impurities in the incoming air through openings 18 tend to deposit on or adjacent the upper surface of disc ring 29 below restricted passage 19, the incoming air thus substantially freed of such impurities then passing through passage 20, passage 22 and into tank 10. When filling tank 10 with liquid through filling device 14 in the normal position shown in Figure 1, air, gases or vapors leave tank 10 in an outward flow opposite to that of incoming air but in a greater volume, tending to flow also through horizontal recess 25 and annular groove 23, thus tending to raise or lift disc ring 29 slidingly upward on cylindrical portion 28; in this outward flow of air, gases or vapors from tank 10, dirt, water and such impurities trapped above disc ring 29 are picked up and carried out through vent openings 18. It will thus be seen that my construction provides simple and automatic self-cleaning means for preventing dirt, water and such impurities in incoming air from entering tank 10.

Threadedly secured to a depending skirt portion 27 of upper shell member 26 is a lower cylindrical housing 16 extending normally downward into tank 10. Suitably secured inside cylindrical housing member 16 are four upper ball rests 34 and four lower ball rests 35 spaced circumferentially about the interior surface of cylindrical housing 16 and extending radially inward therefrom. Ball rests 34 and 35 are similar in construction and design, each having a normally upwardly extending guide portion of minimum radially inward extension, and a lower rest portion of relatively greater radially inward extension, ball rests 34 thus providing upper spaced guides and a lower rest for solid ball 32, and ball rests 35 thus providing upper spaced guides and a lower rest for hollow ball 33. Disposed between the upper ball rests 34 and the lower ball rests 35 is disc ring or rib 31 tightly fitting or integral with cylindrical housing 16. On the lower inner end of cylindrical housing 16 is an open screw cap 38.

The inner lower edge of web 15 adjacent the lower edge of inner cylindrical portion 28 is machined to provide a sealing seat 30 for solid ball 32, while disc ring or rib 31 is machined on its inner edge to provide a sealing seat for hollow ball 33. A preferred material for the different parts of the vent device, including solid ball 32 and hollow ball 33, is brass, although any material resistant to liquids in the tank would be suitable, provided heavy ball 32 is not floatable and provided also that hollow ball 33 is always so constructed that it will float on the liquid in the tank.

It will readily be appreciated that any of several methods of construction and assembly of ball rests 34 and 35 and disc ring or rib 31 in lower cylindrical housing 16 may be utilized. For example, ball rests 34 could be machined in cylinder 16, together with rib and sealing seat 31, while ball rests 35 could be machined separately from cylinder 16 and then, after insertion of hollow ball 33, could be secured and held in place by screw cap 38. Or, only rib 31 need be machined in cylinder, ball rests 34 and 35 being machined separately and held in place on assembly by pressure exerted through the under surface of rib 15, through rib 31, and through screw cap 38. Other means of construction and assembly will be apparent. It is also apparent that while four of each of ball rests 34 and 35 are shown, a minimum of three of each might be used; similarly, a number larger than four of each of ball rests 34 and 35 might be used while retaining sufficient circumferential spacing between the rests to provide adequate passage for air, gas or vapors.

In operation in normal position of my vent device 11 and with the liquid level shown in Figure 1, on withdrawal of liquid from tank 10 air will flow from the outside through vent openings 18 and downward through inner cylindrical portion 28 as above described, dirt, water and impurities in the air being trapped above disc ring 29, the air then flowing downward between the circumferential spaces between ball rests 34 past solid ball 32 resting thereon, through the central opening and ball seat in disc ring or rib 31, thence downward between the circumferential spaces between ball rests 35 past hollow ball 33 resting thereon, and thence into tank 10 through the central opening in screw cap 38. During filling of tank 10 with liquid through filling device 14, a reverse flow of air, gases or vapors will take place, as above described, picking up dirt, water and impurities trapped above disc ring 29 and flowing outwardly through vent openings 18. If tank 10 is overfilled, resulting in a rise of the liquid level to a point shown in Figure 2, hollow or floating ball 33 will rise between the guide portions of ball rests 35 and will seat on the sealing seat provided in disc ring or rib 31, sealing the passage and thus preventing leakage of the liquid through the device which otherwise would occur as a result of bouncing or vibration inherent in a vehicle causing sloshing of the liquid in the tank. On slight tilting of the tank for any reason, and regardless of whether the tank is overfilled, hollow or floating ball 33 first rises to seat sealingly on the seat of rib 31, thus closing the passage and preventing leakage. Upon continued tilting to a greater degree, or if tank 10 be tilted to a marked degree as would occur if a motor vehicle were wrecked and lying on its side or top as indicated by Figure 3, heavy or solid ball 32 seats sealingly on seat 30 of rib 15 by the action of gravity, effectively closing passage 22 and preventing the escape and leakage of any liquid from tank 10; at the same time, under these latter conditions, it is to be noted that hollow or floating ball 33 does not remain seated, and disc ring 29 slides on inner cylinder portion 28 to within restricted passage 19.

It will thus be seen that I have provided a simple vent device which operates automatically to prevent leakage of liquid therethrough from an overfilled or tilted tank, the automatic operation involving the simple rolling and seating of independent spherical floatable and sinkable members thus reducing to a minimum any friction such as sliding friction of any of the movable leakage preventing elements and hence substantially eliminating otherwise possible sticking or binding of such elements and consequent inoperativeness of an automatic vent device, this reduction or elimination of sliding friction applying not only to rolling of the movable spherical members but to the simple seating means for the latter whereby sealing closure is effected without the wear and possible sticking and inoperativeness in the case of slide or friction closures or valves. In addition, the self-cleaning means for removing dirt, water or other impurities from incoming air eliminates the necessity of removing the device for cleaning.

Although a specific embodiment of my invention has been illustrated and described, it will be understood that various alterations in the details of construction may be made without departing from the scope of the invention as indicated in the following claims.

What I claim is:

1. Apparatus of the type described for automatically preventing leakage of liquid through a vent opening from a tank when the latter is tilted or overfilled, comprising a substantially cylindrical housing, a passage through the interior of said housing for placing said vent opening in communication with the interior of said tank, an open circular sealing seat in one portion of said housing, a heavy sinkable ball also in said one portion of said housing, said heavy ball being movable by gravity to occupy said sealing seat and thereby close said passage upon the tilting of said tank, a second open circular sealing seat in a second portion of said housing, and a relatively light floatable ball also in said second portion of said housing, said floatable ball being adapted to occupy said second sealing seat and thereby close said passage upon a rise of liquid in said tank above a predetermined level.

2. Apparatus as set forth in claim 1 including means on the exterior of said housing for securing the latter in an opening in a tank.

3. A vent device of the type described comprising a hollow body member open at one end to provide an interior passage, a vent opening in said body member adjacent the opposite end thereof and in communication with said passage, spherical floatable closing means retained in said body member and adapted to automatically close said passage upon a rise of liquid therein above a predetermined level, and spherical gravity closing means retained in said body member adapted to automatically close said passage by the action of gravity upon tilting of the device.

4. A vent device of the type described comprising a body member including a substantially cylindrical upper shell portion and a substantially cylindrical lower housing portion open at its lower end, a vent opening in said upper shell portion providing a passage through the interior of said body member, a heavy sinkable ball and a relatively light floatable ball spaced longitudinally in said lower housing portion, an open circular sealing seat spaced in said passage above each of said balls for the seating thereof and consequent closing of said passage, and a plurality of circumferentially spaced radially inwardly extending ball rest members in said lower housing portion adjacent and below each of said balls, said ball rest members providing guides and rests for said balls, whereby said floatable ball will seat on its said respective sealing seat to sealingly close said passage upon a rise of liquid therein above a predetermined level, and said sinkable ball will seat on its respective sealing seat to sealingly close said passage upon tilting.

5. The vent device as set forth in claim 4 including means on the exterior of said body member below said vent opening for securing said device in an opening in a tank.

6. The vent device as set forth in claim 4 in which said sinkable ball is solid, and said floatable ball is hollow.

7. A vent device of the type described comprising a body including a substantially cylindrical upper shell member and a substantially cylindrical lower housing member integrally secured thereto, a vent opening in said shell member, an inwardly extending web member at the lower portion of said shell member, an open inner cylindrical member extending upwardly from said web member in said shell member to a point below the upper end thereof, the interior of said cylindrical member and the interior of said lower housing member forming a unitary passage, a horizontal recess in said web member opening from said cylindrical member and in communication through an opening in the top of said web member with an inner space between said cylindrical member and said shell member providing an auxiliary passage, a disc ring slidable on said cylindrical member and normally closing said opening in the top of said web member, and stop means on said cylindrical member adjacent the upper exterior end thereof for limiting movement of said slidable disc ring, said disc ring being adapted to slide on said cylindrical member to open said auxiliary passage.

8. In combination with a tank containing a vent opening, apparatus for automatically preventing liquid leakage through said vent opening from said tank upon the overfilling or tilting thereof, said apparatus comprising a housing secured in said tank, a passage in said housing establishing communication between said vent opening and the interior of said tank, a floating ball in said passage adapted to rise and sealingly close communication between said vent opening and the interior of said tank upon a rise of liquid therein above a predetermined level, and a sinkable ball in said passage and spaced longitudinally therein from said floatable ball, said sinkable ball being movable by the action of gravity to sealingly close communication between said vent opening and the interior of said tank upon the tilting thereof independent of said floatable ball.

9. In a tank having a vent opening and a liquid filling device, apparatus for preventing leakage of liquid from said tank through said vent opening comprising a housing having a passage between said vent opening and the interior of said tank, a floatable ball in said passage adapted to rise and sealingly close said passage upon a rise of liquid therein above a predetermined level, a sealing seat for said floatable ball in said passage, a sinkable ball in said passage spaced therein from said floatable ball and movable by the action of gravity to sealingly close said passage upon the tilting of said tank, and a sealing seat for said sinkable ball in said passage independent of said first mentioned sealing seat.

10. An improved unitary vent device of the type described, comprising a body member adapted to be inserted and secured at one end thereof in an opening in a tank for liquids, said body member having a vent opening adjacent said one end thereof, a main passage in said body member providing fluid communication between said vent opening and the interior of said tank, said main passage including a chamber portion in said body member adjacent said vent opening for trapping impurities in air passing into said tank through said vent opening and main passage, a floatable ball in said main passage for automatically closing the latter upon a rise of liquid above a predetermined level, a sinkable ball in said main passage for automatically closing the latter by the action of gravity upon tilting, a separate sealing seat in said main passage for each of said floatable and sinkable balls, an auxiliary passage in said body member between said chamber portion and said balls, thereby providing additional fluid communication between said chamber portion and the interior of the tank for increased flow of gases from the latter, and closure means for said auxiliary passage automatically releasable to open the latter upon tilting or a predetermined increase in pressure of gases in said tank.

11. An improved unitary vent device of the type described, comprising a body member adapted to be inserted and secured at one end thereof in an opening in a tank for liquids, said body member having a vent opening adjacent one end thereof a main passage in said body member providing fluid communication between said vent opening and the interior of said tank, said main passage including a chamber portion in said body member adjacent said vent opening for trapping impurities in air passing into said tank through said vent opening, an auxiliary passage in said body member between said chamber portion and said main passage providing additional fluid communication between said chamber portion and the interior of the tank for increased flow of gases from the latter, and closure means for said auxiliary passage automatically releasable to open the latter upon a predetermined increase in pressure of gases in said tank.

JOHN W. GEISLER.

REFERENCES CITED

The following references are of record in the file of this patent:

UNITED STATES PATENTS

| Number | Name | Date |
|---|---|---|
| 412,982 | Schenck | Oct. 15, 1889 |
| 484,348 | Utley | Oct. 11, 1892 |
| 924,641 | Crispin | June 15, 1909 |
| 1,388,602 | Rotteleur | Aug. 23, 1921 |
| 1,698,990 | Derryberry | Jan. 15, 1929 |
| 1,859,479 | Thwaits | May 24, 1932 |
| 2,194,348 | Zoder | Mar. 19, 1940 |
| 2,240,457 | Graf | Apr. 29, 1941 |
| 2,306,974 | Oestermeyer et al. | Dec. 29, 1942 |